Dec. 17, 1963    H. REIFENHÄUSER ETAL    3,114,282
APPARATUS FOR THE TRANSVERSE SEVERANCE OF
CONTINUOUSLY MOVING TUBULAR STRUCTURES
Filed March 24, 1959    2 Sheets-Sheet 1
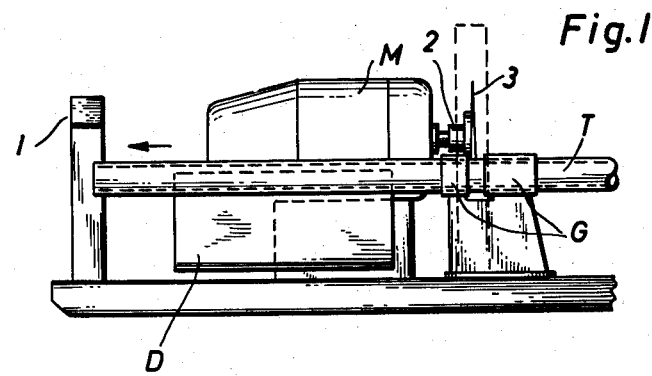
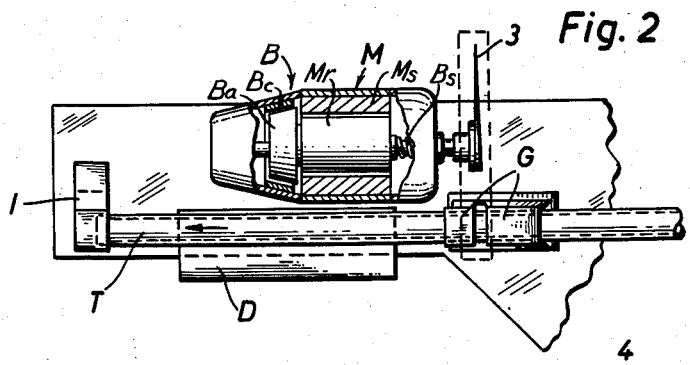
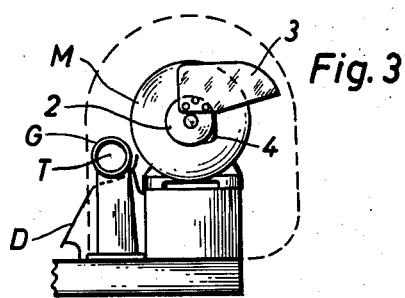
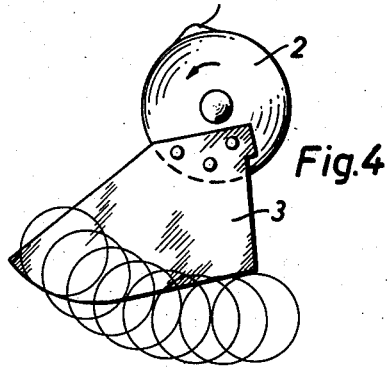
INVENTORS
HANS REIFENHÄUSER +
FRANZ SOMMERFELD
BY Williams, Tilbury
& Gobrick
ATT'YS Dec. 17, 1963  H. REIFENHÄUSER ETAL  3,114,282
APPARATUS FOR THE TRANSVERSE SEVERANCE OF
CONTINUOUSLY MOVING TUBULAR STRUCTURES
Filed March 24, 1959  2 Sheets-Sheet 2
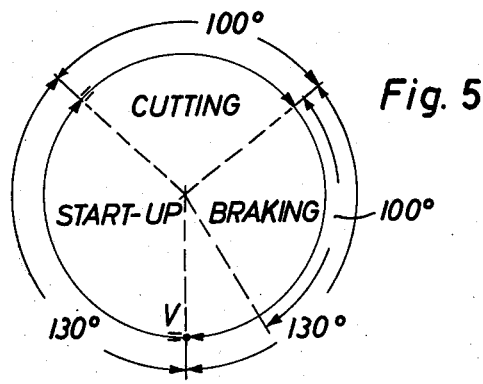
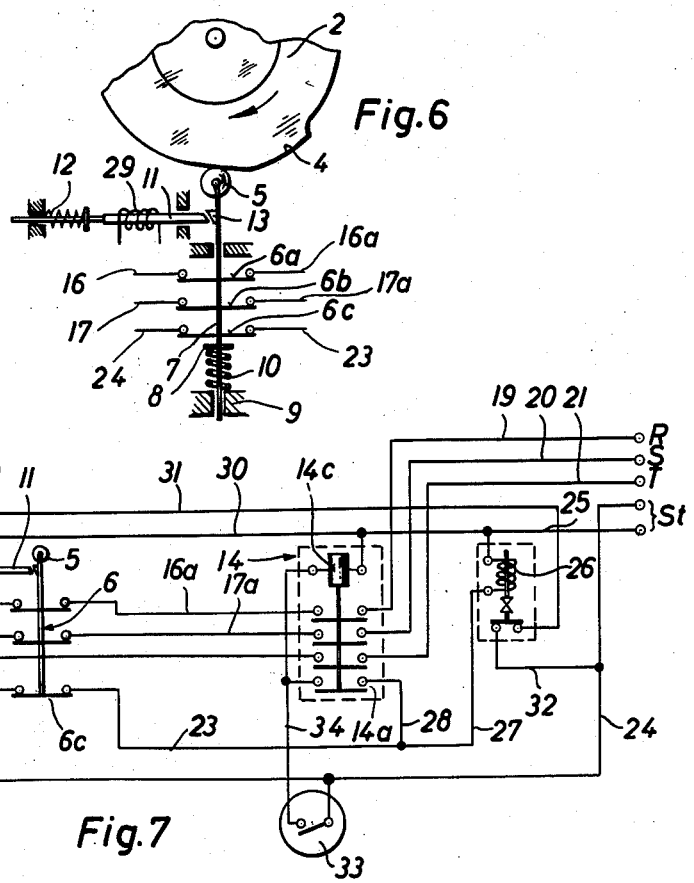
INVENTORS
HANS REIFENHÄUSER +
FRANZ SOMMERFELD
BY Williams, Tilberry
& Golrick
ATT'YS.

United States Patent Office 3,114,282
Patented Dec. 17, 1963

3,114,282
APPARATUS FOR THE TRANSVERSE SEVERANCE OF CONTINUOUSLY MOVING TUBULAR STRUCTURES
Hans Reifenhäuser, Troisdorf-Cologne, and Franz Sommerfeld, Wahn, near Cologne, Germany, assignors to Reifenhauser K.G., Troisdorf-Cologne, Germany
Filed Mar. 24, 1959, Ser. No. 801,505
Claims priority, application Germany Apr. 5, 1958
8 Claims. (Cl. 83—203)

The invention relates to a method of and apparatus for the continuous transverse severance of continuously moving tubular structures of cuttable substances, more particularly of thermoplastic tubing of reduced wall thickness and large diameter, as it is endlessly or continually produced, with the use of a cutting knife swung by polyphase motor having a short-circuited rotor and a sliding brake or similar device.

In known prior art apparatus of the kind specified the advance of the tubing away from an extruding or forming nozzle, where it is being continuously produced has to be interrupted for a short time to allow of severance. No means nor methods have been known for cutting such a continuously moving tubular structure uniformly, and advance of the same has to be stopped during cutting, so that a pile-up of material between the nozzle and the knife results. The difficulties have been even more acute in the case of hollow articles of reduced wall thickness and large diameter, for it has been, as a practical matter, impossible to avoid deforming the plastic.

The invention proposes ways and means of stisfactorily cutting a continuously moving tubular structure of sectile substances, more particularly thermoplastics. According to the invention, after the continuously moving tubular structure has reached the length which it is required to sever, the forward end of said structure initiates, by way of an exploring or sensing element, a signal for switching on a polyphase motor having a short-circuited rotor and a sliding rotor type brake, whereupon said motor is accelerated from a standstill to its rated speed through an angle of say about 130°, runs at its rated speed through an angle of about 100° and, while doing so, effects a parting cut through the agency of a cutting blade mounted on the motor shaft, whereafter the motor energizing current is switched off by control elements operated by the motor shaft and the motor is brought to a standstill through an angle of about 130°, the whole cycle being completed in one complete revolution of the motor. In this case, therefore, the problem to which the invention is addressed is solved mainly by a greatly accelerated cutting speed, cutting taking only slightly more than 0.01 second in a typical application in conjunction with a plastic tubing extrusion press.

In this very short time, however, the advance of the tubular structure is so slight that there is practically no measurable piling-up of the tubing behind the knife.

According to a further elaboration of the invention, the motor is controlled by one quick-acting and one delayed switch, the two switches being in a serial relationship such that the quick-acting switch is the first to be tripped by the motor shaft and is kept open by suitable means until the delayed switch has cut off the current completely.

By a delayed switch is understood here a conventional contactor which requires some time to trip. This tripping time is too great to allow of the motor being braked in good time to a standstill at the initial position—i.e., after one complete revolution—after the termination of severance, and so there is provided between the motor and the contactor a quick-acting switch, for instance, a simple mechanical break switch which just opens two or three of the phase leads to the motor (hereinafter termed merely "phases") and also a contactor holding circuit. Also, the break switch is held open by suitable means until the contactor has opened the circuit completely.

There is another advantage in mechanical tripping by a break switch. Even if the operating time of a contactor were satisfactory, contactor operating times vary so much, because of the different phase relationships of the mains, that it would be impossible always to stop the motor exactly at the same point after one revolution in the manner essential for correct operation of the apparatus.

In an apparatus for carrying into effect the method of the invention, the motor shaft end face is provided with a knife which extends beyond the shaft in one direction and has a generally convex sickle-shaped cutting edge. The sickle-shaped knife performs a drawing cut, this producing an appropriately smooth cut surface, the plane of which lies substantially perpendicular to the axis of the tubular structure, which is continuously advanced in the cutting region of said knife.

Any deviation from the perpendicular, for instance, because the tube is advanced more rapidly, can be corrected by slightly inclining the knife axis.

Another feature of the apparatus according to the invention is a spring-closed break switch—controlling at least two phases to the motor and also the contactor self-holding contact circuit—has a longitudinally moved actuating element or rod provided with a cam-follower roller bearing against the motor shaft as a cam or a cam disk thereon, said roller being moved for opening of the break switch by a projection or cam formation on the shaft, while when the break switch is opened a projection on the rod is engaged by a laterally disposed spring-loaded mechanical locking device to keep the break switch open.

Hence the break switch is controlled in a simple manner by a cam which operates the same directly by way of the roller and to open the contacts. Thereupon the mechanical lock on the break switch operates to lock the same in the "off" position.

According to the invention, the locking device is released after a predetermined time, for example say one second, by a device controlled by the break switch. The latter device comprises a solenoid operated by the contactor control voltage, the solenoid armature being engaged by a spring force with the break switch lock, while the solenoid supply circuit is provided with a delay relay, control current flowing through the winding of the delay relay so that, when the control circuit is opened by the break switch, the relay armature drops and one second later closes the energising circuit for the solenoid. The armature thereof is drawn back against the spring force and the break switch is released to return to its initial position with roller bearing on the cam.

The internal inertia (rotor of the electric motor), the external inertia (knife, knife holder and control cam), brake spring adjustment, and the starting power and rated speed of the motor must be adapted to one another if stable operation is required—i.e., to ensure that the motor always starts the cycle of operations from the same place and that the stopping place of the knife does not slowly advance about the circle with the untoward extreme result either that the knife stops the advance of the substance to be cut or that the control cam remains on the roller and the next cycle cannot start.

An embodiment of the invention is illustrated in the drawings wherein:

FIG. 1 is a side elevation of a complete plastic tubing cutting apparatus;

FIG. 2 is a plan view of the apparatus illustrated in FIG. 1;

FIG. 3 is a front elevation showing the motor shaft end, certain mechanical switch elements of FIG. 6 being here omitted for clarity of representation;

FIG. 4 illustrates schematically the progress of a cut, various positions of the knife relative to the tubular object being indicated by the series of circles representing a single tube having in fact an undeviating axial location;

FIG. 5 is a motor working cycle diagram of the arrangement;

FIG. 6 is a diagrammatic illustration of the cam-operated quick-acting break switch; and FIG. 7 is a circuit diagram of the control system.

In the drawings a cut-off apparatus performing and embodying the method and structure of the present invention is shown as applied to cutting successive equal lengths from tubing T continually produced by and moving toward the left (as viewed in FIGS. 1 and 2) from the nozzle say of a plastic extrusion press, (not shown). A polyphase induction motor M, that is an induction motor designed to be energized by two or more phases of electric power from a source of a like number of phases, is disposed with shaft axis in spaced parallel relation to the axis of the continually produced and advancing tubing passing through a correspondingly sized two-piece cylindrical guide G of a tube support post toward a tubing end sensing device indicated in generalized form at 1; and between the support post and sensing device there is located an inclined formed plate D for directing cut tubing lengths over the edge of the cutter supporting base into a container. The motor shaft, through a disk plate or flanged collar 2 affixed thereon carries a radially projecting cutter knife blade 3 arranged to pass between the axially spaced parts of the guide G for severing a length from the tubing, the space about the region of blade travel being enclosed in practice by a guard as indicated by the dashed outline.

The polyphase induction motor M (see FIG. 2) has a "short-circuited" rotor Mr and a frictional sliding rotor type brake B in an arrangement well known in the hoisting equipment art; the rotor and therewith rotor brake shoe element Ba therein being biased by spring Bs in the direction of the arrow into braking engagement with a fixed drum or disk Bc when the motor power is cut off, and electromagnetically withdrawn by stator Ms and released when the motor is energized.

The blade 3, best seen in FIGS. 3 and 4, has a cutting edge shaped to effect a drawing cut, as may be seen particularly in FIG. 4 wherein the several circles represent the changing relative position of the blade engaging the tubing as the cut progresses. The blade cutting edge is on the whole curved convexly, having a sickle-shape outline. From the "heel" of the blade (i.e., the forward or leading portion of the edge lying closest to the rotational axis, which first encounters the cylindrical object to be cut and may have slight or no curvature) outward toward the "toe," the edge has increasingly convex curvature quite marked near the toe or outer end which performs the last of the cutting, whereby a "drawing cut" effect is maintained as the points of cutting contact move through the tubing, radially receding from the axis of rotation.

An arrangement of mechanical elements in an electrical mechanical control system for carrying out the process in a cutting cycle involving a single revolution of the motor shaft, as indicated in FIG. 5, appears in FIG. 6; and the corresponding circuitry is shown in FIG. 7. As appears from schematic FIG. 6, in effect a left side view of the collar 2, the disk plate or the flange of the collar 2 has a generally circular periphery with, however, a cam formation or projection 4, thereby to serve as cam surface for the cam follower roller 5 mounted on the end of the axially slidably mounted actuating rod 7 of a mechanical break switch 6. Three contact bridges 6c, 6a, 6b mounted in appropriate insulated manner upon the operating push-rod are normally biased to closed position against three corresponding pairs of contacts (respectively switching the control circuit lines 23—24, and two motor phase leads 16—16a and 17—17a) by a compression spring 10, interposed between a rod shoulder or flange 8 and a fixed reaction surface 9 provided by the switch housing or the like, and urging the rod radially of the motor shaft toward roller contact with the periphery of the cam.

As the cam surface is circular over its circumference except for the formation 4, the switch 6 would be closed over nearly an entire revolution; but solenoidally released latching means are provided to lock switch 6 open for a certain time once it is opened by transit of cam formation 4 over roller 5. The latching is here provided by a longitudinally slidably mounted armature latch bar 11 urged by compression spring 12 toward switch rod 7 to engage behind a lug or shoulder formation 13 on the rod in a detent latching arrangement, the armature having a beveled end corresponding to a lead bevel on lug 13 to permit ready escape of the latch bar over the lug. The latch is released as hereinafter described upon energization of the latch solenoid coil 29. It may be here noted that, in view of the relatively high peripheral speed of the cam, the rise from the circular surface to the full height of formation 4 has a low slope at the leading side as shown. The switch 6 is mounted at any convenient location with the rod disposed radially relative to the blade mounting collar 2 and to one side of the plane of the cutter blade path, the angular spacing of the blade relative to the formation 4 being chosen accordingly for opening the switch 6 after the cut is completed in the cycle herein described.

Considering now the circuitry of FIG. 7, a conventional contactor unit 14 controls the main power leads 19, 20, 21, from the terminals R, S, T, of a polyphase power source to the separate phase leads 16a, 17a, and 18 respectively; and also has a fourth pair of self-holding contacts. The control circuitry, shown as supplied from separate power source St by leads 24, 25, includes a "normally closed" time delay relay 26, the operating solenoid 14c of the normally open contactor unit 14, and the here broadly termed "switch 33" of tubing end sensing unit 1. The circuitry of FIG. 7 is shown in completely non-operating condition with the switch contacts in the positions to which they are respectively biased, that is, with 14 open, and 6 and 26 closed.

In the contactor holding circuit the coil 14c is connected on one side directly to lead 25; while the other side is connected through a component 33 (functioning as a switch in sensing device 1) in line 32 to lead 24, and also through holding contacts 14a, lines 28, 23 and break switch contacts 6c to line 24. Hence, upon closure of 14 by even a short current derived from closure of 33, with the break switch closed, the closure of 14a in the contactor completes a circuit branch parallel to switch 33, so that the contactor remains closed until 6c is opened by cam formation 4 encountering roller 5.

One side of the latch solenoid 29 is connected directly to control power lead 25 by line 30, and the other by line 31, the contacts in relay 26, and line 32 to lead 24; the solenoid of relay 26 being connected on one side directly to 25, and on the other through lines 27—28 and break switch contacts 6c to lead 24. Thus the solenoid of relay 26 is energized and opened only when 6c is closed.

The sensing unit including the "switch" 33 may have various forms, as a mechanical system actuated by contact of the end of advancing tubing to close momentarily a switch (a normally open switch 33) to produce a current flow or pulse in 14c effecting initial closure of 14, or a photoelectric cell-light beam system wherein interruption or variation of the light by the tube end produces a cell output pulse or signal, thereafter amplified to operate a relay switch serving the function of 33 or even to directly pulse 14c. Such being known to the art and the specific form thereof being no part of the present invention, the same are not here detailed.

The electromechanical arrangement operates as follows:

By means of the sensing element, serving as or actuating switch 33, an order, signal or pulse to switch on the apparatus is transmitted to the contactor when the forward end of the tubing T reaches a position predetermined by the length of tubing which it is required to sever. Upon receipt of the order presented as a current pulse to solenoid 14c, the contactor closes to allow the full current to flow to the motor and to close the contactor holding circuit through 14a and 6c, since the break switch is closed when the apparatus is in condition for the beginning of the overall motor operation and control cycle. Immediately current flows through the motor, the sliding rotor with attached brake shoe Ba is electromagnetically withdrawn axially from the brake drum or disk by the stator Ms through induction, and the motor rotates through about 130°, during which angle it accelerates to its rated speed of, for instance, 1000 r.p.m. (cf. the motor operating diagram, FIG. 5, wherein V represents the location of a reference point on the shaft at the start of the motor operation cycle). The motor continues to rotate at its rated speed through about the next 100°. Cutting is performed during this 100° rotation i.e., in a time of 0.0167 second. Upon the completion of cutting i.e., after the motor has rotated through approximately 230°, the switch 6 is pressed down against the bias of spring 10 by the cam 4 to open the two phases 16, 17 for deenergizing the motor and also the contactor holding circuit through 6c for release of the contactor. The stator field collapses immediately and the brake element on the rotor is pressed into the brake drum by the brake applying spring, the motor being braked rapidly so as to stop in position V. By the time the motor comes back to this position, the cam formation 4 must have passed completely over the roller so that the switch 6 not impeded by the cam lug from returning by spring force to its initial closed position when the mechanical lock 11—13 is released after one second by the delay relay 26 and solenoid 11.

This cycle of operations is based on the following steps: After the cam 4 has passed the roller 5 of the break switch 6, the armature 11 is engaged with the rod lock lug 13 of the switch 6 by the biasing spring 12. Also, the phases 16, 17 and the control circuit 23, 24 have been opened and the motor thereafter braked. Due to the opening of the control circuit at 6c, the relay winding 26 is deenergized and releases its armature which recloses after a dropping time of one second, the control circuit side 30—32 for the solenoid winding 29. Hence, after one second has elapsed, which practically speaking is one second after completion of the motor rotation, upon closure of contacts in 26, the armature 11 is drawn back by the solenoid against spring 12 into releasing position, and the released break switch 6 returns to the position where its contacts 6a, 6b close the circuit portions 16—16a and 17—17a connected to it, but the motor is not energized since 14 is open. However, by closing of 6c the auxiliary control circuit 23, 24, 25, 27 for energizing the solenoid of the delay relay 26 is completely closed; and the delay relay armature therefore returns quickly after closure to control cycle initial open position, opening the contacts of the latch solenoid winding circuit, so that the latch armature 11 is spring-urged back toward the lead in slope of lock lug 13. Hence, latching engagement can again occur when the switch 6 is next actuated by the cam lug 4.

Thus although the entire revolution of the shaft in the given example occurs during an interval of some hundredths of a second, due to the dropping time of the relay, the switch 6 is not restored to its initial condition as at the beginning of the entire control cycle, for the relatively long period of one second. During this period of course the tubing is advancing toward the sensing unit, and accordingly the dropping time is so chosen that the apparatus is ready for another cut when the tube end arrives at the sensing element to initiate another cycle.

Cutting times to suit the length of tube required to be severed or to suit the rate of advance of the tubular structure can therefore be provided by adjusting the dropping times and the delay relay. Instead of a photocell, it is possible to use any other kind of exploring element, for instance, a photoresistor, limit switch or the like, which, when abutted by the end of the tubular structure, transmits the switch-on order to the contactor 14.

We claim:

1. An apparatus for the successive severance of lengths from a continuously axially advanced tubular structure comprising: a polyphase induction motor mounted with its rotor shaft in spaced parallel relation to the path of advance of the structure, said motor having an internal brake released and applied when the motor is respectively energized and deenergized, a knife blade secured to and extending outwardly from said shaft substantially in a radial plane to describe a circular path through the path of the tubing, means including a tube end-sensing element spaced in the direction of tube advance away from the blade path, said means being adapted to initiate a motor starting signal upon sensing of the tube end advanced to said element, said motor being adapted to accelerate from an initial stopped position in about one-third of a revolution to a speed giving the blade a high linear speed relative to the speed of the tubing whereby the tubing is cut substantially at right angles to its axis, quick acting control means operated by the motor shaft for deenergizing the motor and thereby causing brake application after the shaft has rotated a further fraction of a revolution for tubing cut-off, the brake being adapted to bring the motor to a standstill in the remaining part of one complete revolution of the motor, said control means including camming means driven by the motor shaft, a spring-closed quick acting break switch having contacts switching at least two phases of the motor and also a control circuit branch, said camming means being adapted for opening the break switch once for each motor revolution after the blade has passed through the path of the advancing tubing, and solenoidally released detent latch means for retaining the break switch open upon cam actuation thereof, the solenoid of the latch means being operable to release said break switch to closed position a pre-timed interval after opening of said control circuit branch.

2. Apparatus according to claim 1, wherein the knife blade has a cutting edge generally convexly shaped and becoming increasingly convex toward its outer trailing portion for introducing draw-cutting effect throughout the tube severance.

3. Apparatus according to claim 1 wherein said camming means comprises a cam on the motor shaft, and said break switch a push-rod opened switch disposed with push-rod in radial cam following relation.

4. Apparatus according to claim 1 wherein said control circuit branch includes in series across a control power source the solenoid of a normally closed delay relay and switch contacts of the break switch, the delay relay contacts controlling energization of the latch solenoid, whereby the latch is released for closing the break switch a predetermined interval after the motor has been braked.

5. Apparatus according to claim 4, characterized in that the sensing unit includes a photocell as a tube end sensing element providing a signal to the contactor solenoid to close the contacts therein on sensing a tube end.

6. Apparatus according to claim 1, including a normally open contactor unit with a closing solenoid energized by a current derived from the first said means, said contactor having self-holding contacts connected between the contactor solenoid and the control branch contacts of the break switch as a series circuit branch across a control power source.

7. Apparatus according to claim 6, wherein the means including the sensing element provides a normally open switch responsive by closing to actuation of the said element by a sensed tube end, the last said switch being in parallel to the series connected self-holding and control branch contacts.

8. An apparatus for the successive severance of lengths from a continuously axially advanced tubular structure comprising a polyphase induction motor mounted with its rotor shaft in spaced parallel relation to the path of advance of the structure, said motor having a sliding brake actuated when the motor is deenergized, a knife blade secured to and extending outwardly from said shaft substantially in a radial plane to describe a circular path through the path of the tubing, said motor being adapted to accelerate from an initial stopped position in about one-third of a revolution to a speed giving the blade a high linear speed relative to the speed of the tubing whereby the tubing is cut substantially at right angles to its axis, quick acting control means operated by the motor shaft for switching off the motor and causing brake application after the shaft has rotated a further fraction of a revolution for tubing cut-off, the brake being adapted to bring the motor to a standstill in the remaining part of one complete revolution of the motor; said control means comprising a cam on the motor shaft having a cam projection thereon, a slidably mounted push-rod generally radially disposed to said cam and biased by a spring into cam following relation therewith, a quick acting break switch opened by said cam projection displacing the push-rod and closed by said spring, solenoidially released detent type rod latch means for locking the switch open, a normally open contactor unit having self-holding contacts and respective contacts for each phase line supplying the motor, said break switch having first contacts in a control circuit line and respective contacts inserted in at least all of the motor phase leads but one between the motor and contactor, the self-hold contacts and said first contacts being connected in series with the contactor solenoid across a control circuit power supply whereby opening of the break switch opens the contactor, an externally actuated switch means in series with the solenoid of the contactor across said supply for initiation of a cutting cycle upon brief closure thereof, and a time delay relay with normally closed contacts controlling the release of the latch means and having the solenoid thereof in series with said first contacts across said supply, said delay relay being adjustable in dropping time for closure thereof after the motor has been braked to a standstill at completion of a revolution.

References Cited in the file of this patent

UNITED STATES PATENTS

| | | |
|---|---|---|
| 1,975,487 | Topping | Oct. 2, 1934 |
| 2,101,753 | Rambold | Dec. 7, 1937 |
| 2,364,716 | Huebner et al. | Dec. 12, 1944 |
| 2,587,732 | Jaeger | Mar. 4, 1952 |
| 2,694,448 | Petersen | Nov. 16, 1954 |
| 2,879,416 | Blanz | Mar. 24, 1959 |
| 2,939,354 | King | June 7, 1960 |
| 2,958,243 | Foster | Nov. 1, 1960 |

FOREIGN PATENTS

| | | |
|---|---|---|
| 972,583 | France | Oct. 30, 1950 |